(12) United States Patent
Alam

(10) Patent No.: US 12,391,382 B2
(45) Date of Patent: Aug. 19, 2025

(54) MULTI-PAYLOAD DRONE DELIVERY SYSTEM AND METHOD

(71) Applicant: Sohail Alam, Houston, TX (US)

(72) Inventor: Sohail Alam, Houston, TX (US)

( * ) Notice: Subject to any disclaimer, the term of this patent is extended or adjusted under 35 U.S.C. 154(b) by 19 days.

(21) Appl. No.: 18/479,879

(22) Filed: Oct. 3, 2023

(65) Prior Publication Data

US 2025/0108917 A1    Apr. 3, 2025

(51) Int. Cl.
| | |
|---|---|
| *B64D 1/12* | (2006.01) |
| *B64U 20/70* | (2023.01) |
| *B64U 101/64* | (2023.01) |
| *G05D 1/00* | (2006.01) |
| *G06K 7/10* | (2006.01) |
| *G06Q 10/0832* | (2023.01) |
| *G06Q 10/0833* | (2023.01) |

(52) U.S. Cl.
CPC ............. *B64D 1/12* (2013.01); *B64U 20/70* (2023.01); *G05D 1/101* (2013.01); *G06K 7/10415* (2013.01); *G06Q 10/0832* (2013.01); *G06Q 10/0833* (2013.01); *B64U 2101/64* (2023.01); *B64U 2201/20* (2023.01)

(58) Field of Classification Search
CPC ...... B64D 1/12; B64U 20/70; B64U 2201/20; B64U 2101/64; G05D 1/101; G06K 7/10415; G06Q 10/0832; G06Q 10/0833
See application file for complete search history.

(56) References Cited

U.S. PATENT DOCUMENTS

| | | | |
|---|---|---|---|
| 9,412,280 B1* | 8/2016 | Zwillinger | G05D 1/0676 |
| 11,334,078 B1* | 5/2022 | Kim | G05D 1/0276 |
| 2013/0259634 A1* | 10/2013 | Raz | B64D 1/22 414/801 |
| 2017/0267347 A1* | 9/2017 | Rinaldi | B65D 81/022 |
| 2018/0130008 A1* | 5/2018 | Liu | G06Q 10/083 |
| 2018/0228311 A1* | 8/2018 | Bloom | A47G 29/20 |
| 2021/0380244 A1* | 12/2021 | Leverman | B64U 70/90 |

* cited by examiner

Primary Examiner — Rodney A Bonnette

(57) ABSTRACT

Disclosed herein is an unmanned aerial vehicle (UAV) delivery system. The UAV, equipped for vertical takeoff and landing, has a specially designed external frame made of durable and lightweight materials. This frame can hold one or more internal frames, each tailored to store and selectively release packages. The delivery system also features a dynamic drop container that can automatically receive and store packages based on their identifiers, maintaining their temperature with an integrated regulation system. The invention further incorporates a mobile application, enabling users to track packages, interact with the system's components, and exercise limited control over the delivery process. Users can categorize deliveries based on urgency, with specific weight limits defined for each. Vendors prepare the items in specialized drone delivery packets, which can be configured to maintain specific temperatures. In essence, this UAV-based solution streamlines and elevates the package delivery process, offering flexibility, efficiency, and user engagement.

16 Claims, 3 Drawing Sheets

MULTI-PAYLOAD DRONE DELIVERY SYSTEM AND METHOD

TECHNOLOGICAL FIELD

The present invention relates to the field of unmanned aerial vehicles (UAVs) and, more particularly, to a package delivery system for UAVs. The invention focuses on an advanced delivery system that facilitates the storage, transport, and precise delivery of packages through a combination of mechanical frames and automated software controls.

BACKGROUND OF THE INVENTION

With the rapid evolution of UAVs, their applications have expanded from hobbyist and military uses to commercial services such as package delivery. Traditional package delivery systems involve manual labor, which may be inefficient, time-consuming, and susceptible to errors. Moreover, existing delivery systems for UAVs often lack the sophistication needed for precise and efficient deliveries, posing challenges in scenarios where the exact location or the state of the package is crucial.

Furthermore, conventional UAV delivery systems offer limited interactivity to end users, leaving them uninformed or with minimal control over the package's delivery status. There is, therefore, a pressing need for a more sophisticated, precise, and user-friendly package delivery system for UAVs that bridges these gaps and caters to the increasing demand for faster and more reliable deliveries.

The prevailing drone delivery systems in the market currently face a significant limitation: they are not designed to accommodate and deliver multiple packages of varying sizes and weights to different destinations in one singular flight operation. Recognizing this gap, the invention being disclosed herein introduces a transformative method for UAV package delivery.

This novel system is characterized by several defining features that make it stand out. Firstly, it guarantees safety throughout its operations, eliminating risks associated with traditional and other UAV delivery methods. In terms of user experience, the system is not only easy to use but is also built with a user-friendly interface, providing the end-user with an intuitive and seamless interaction. Concerns over package security and user privacy, which have been recurrent issues with current systems, are effectively addressed. The newly presented method has anti-theft measures integrated into its design and diligently ensures the maintenance of customer privacy.

Financially, the invention holds promise. It is not just a cost-effective solution but also has the potential to be a profitable venture, adjusting market pricing due to its wholesale application. By paving the way for scalability, the method offers an open invitation for multiple vendors to dive into the drone delivery market. The system is designed for broad use, which can significantly expedite regulatory processes, benefiting both vendors and consumers. Remarkably, while the idea of using drones for delivery is not new, this method introduces a pioneering concept: making multiple deliveries in a single operation. Such an innovation is set to usher in a profound shift in the drone delivery sector, revolutionizing how packages are delivered and setting new standards in efficiency, reliability, and user engagement.

BRIEF SUMMARY OF THE INVENTION

The present invention provides an innovative delivery system for UAVs that enhances precision, reliability, and user interaction. Key features of the invention include:

Integrated Frame System: The invention encompasses an external frame attached to the UAV, with one or more internal frames. The proximal end of these internal frames connects to the top portion of the external frame, and the distal end includes a release mechanism designed to selectively release stored packages.

Removable Frames: The internal frames can be detachably connected to the external frame, enabling adaptability to various delivery needs and facilitating maintenance and package loading. Furthermore, the internal frames have a plurality of inner notches that allow for the selective support and release of packages in the sequence they are intended to be delivered.

Drop Container: A drop container with a selectively openable top is introduced. This container includes a package identifier reader designed to scan package identifiers. This advanced container can automatically open its top upon detecting the package's identifier, enabling seamless package reception from the UAV.

Package Communication Technology: The package identifier reader and the package identifiers can communicate using multiple technologies, including but not limited to near field communication, radio-frequency identification, Bluetooth, Wi-Fi, infrared, and cellular.

Smart Interactivity: The delivery system integrates with a smart device application, allowing users to track packages, interact with the package delivery system's components, and exert limited control over its operations.

Automated Delivery Method: The invention offers an automated method for package delivery, where the UAV determines its position relative to a drop zone, calculates and follows a movement trajectory, and releases the package once it's verified to be proximate to the target zone.

Through these features, the present invention substantially advances the state of UAV package delivery systems, offering more reliable, efficient, and user-friendly deliveries.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
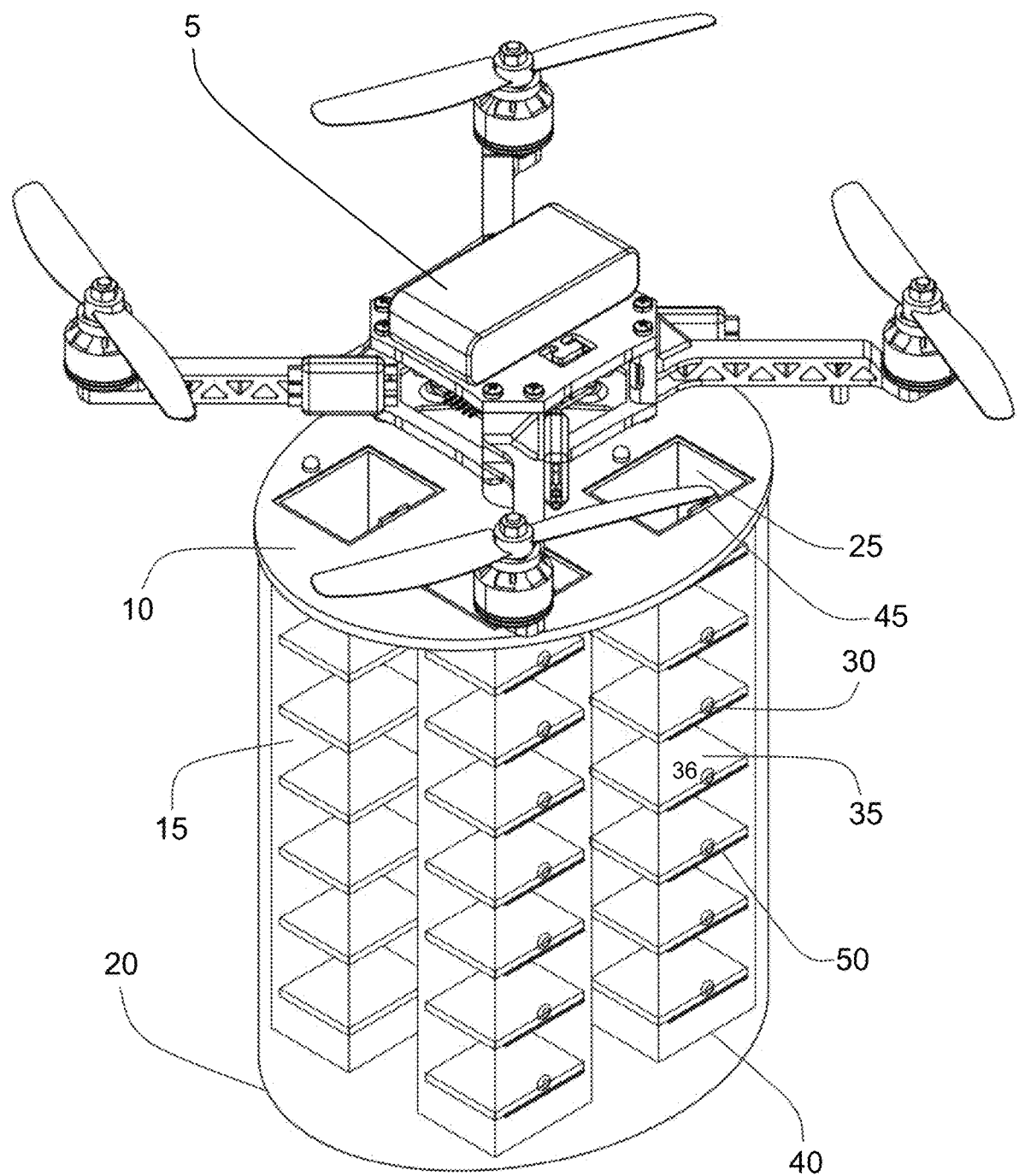
FIG. 1 illustrates a perspective view of an example unmanned aerial vehicle (UAV) having a delivery system according to one embodiment of the present disclosure.

Referring to the drawings, wherein like reference numerals designate identical or corresponding parts throughout the figures, and more particularly to FIG. 1, a perspective view of an unmanned aerial vehicle (UAV) 5 equipped with a delivery system is illustrated. In the preferred embodiment, the UAV is a conventional mid-sized drone designed for vertical takeoff and landing. It can carry payloads ranging from 0.1 kg to 50 kg and features angle-driven low-pitch propellers for smooth take-off.

The delivery system comprises an external frame attached to the UAV 5. The external frame features a top portion 10. In practice, the external frame is made from a combination of durable and lightweight materials. It is securely affixed to the base of the UAV, aligning with its wings, tails, engines, and wheelbase. The frame can adopt either a cylindrical or rectangular form and is preferably constructed from clear plastic or an opaque substance, offering a shield against unfavorable weather elements like rain, wind, or snow.

FIG. 1 further showcases one or more internal frames 15 which are coupled to the top portion 10 of the external frame at their proximal ends. Each internal frame 15 has a distal end equipped with a release mechanism 40. The release mechanism 40 is configured to selectively release packages 35 stored within the internal frames 15. The one or more internal frames further comprise a plurality of inner notches 50 that allow for the selective support and release of packages in the sequence they are intended to be delivered. In some embodiments, the inner notches 50 function passively, for instance, through a friction-based system where the notches gently hold onto the packages. As the bottommost package is released from the internal frame 15, these frictional notches ensure that the other packages do not fall out unintentionally, providing a controlled delivery sequence. In other embodiments, the inner notches 50 can also be integrated with an actuated or mechanical movement. In this setup, once the release mechanism 40 at the distal end dispenses a package, the notches can actively shift or adjust to release the next package in line. This ensures a systematic and sequential delivery, where each package is released in the order it's intended to be delivered, providing both precision and efficiency to the delivery process.

The delivery system further comprises a control system configured to be communicatively coupled with the various electronic and mechanical components 30 of the system. The hardware components of the control system can be located entirely on the UAV, entirely on the external frame, entirely within the internal frames, or on a combination thereof. The control system contains program instructions that, when executed, perform one or more of the following:

determining the position of the delivery system relative to a predetermined target drop zone, calculating a movement trajectory required for positioning the distal end of the internal frame containing the package proximate to the target drop zone, actuating the propulsion system of the delivery system to execute the calculated movement trajectory, verifying that the delivery system is proximate to the target drop zone, and releasing the stored package from the internal frame upon confirmation that the delivery system is proximate to the target drop zone.

Figure 2:
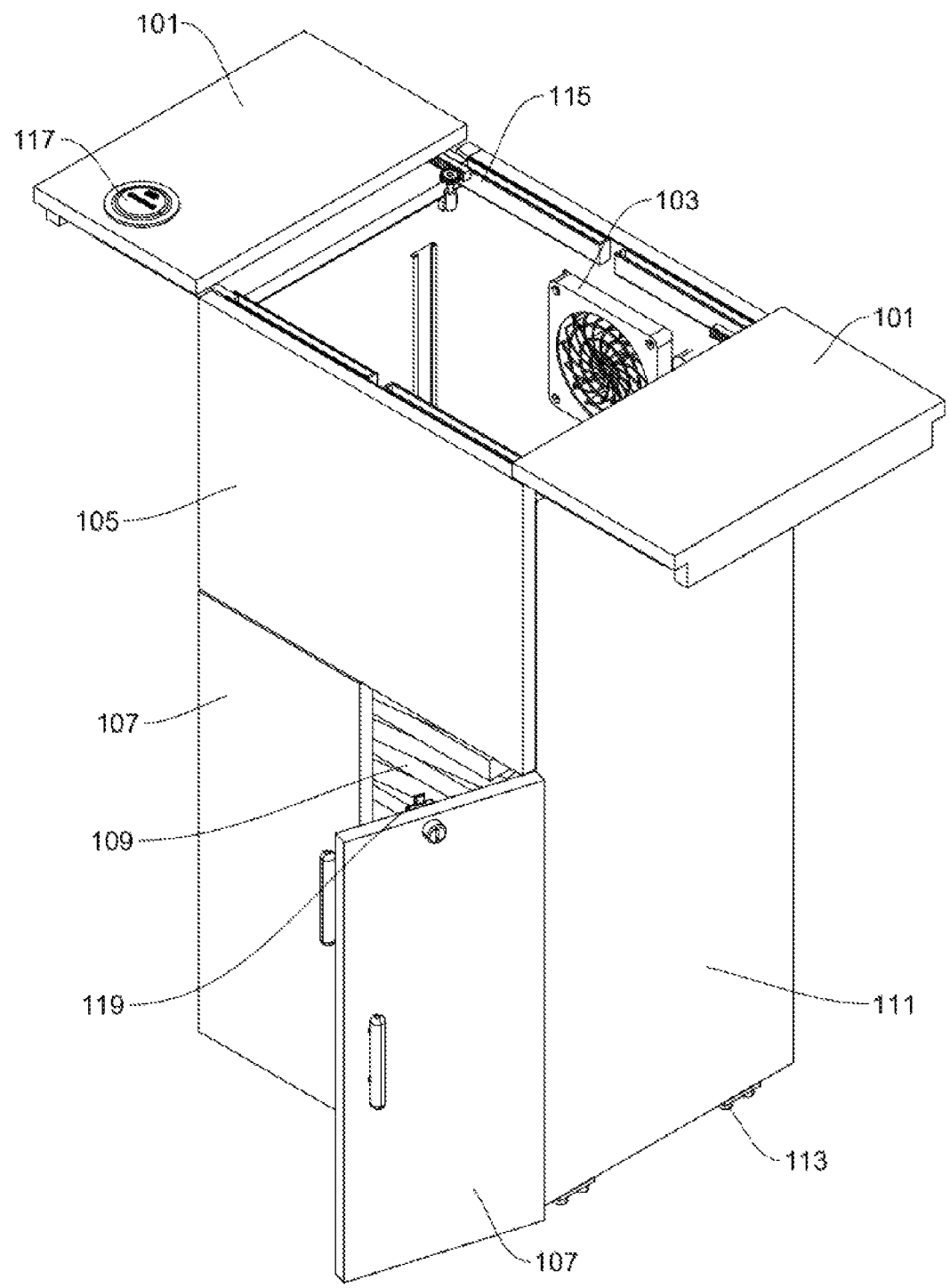
FIG. 2 illustrates a perspective view of a drop container according to one embodiment of the present disclosure.

FIG. 2 illustrates a drop container 111 used with some embodiments of the delivery system disclosed herein. This drop container 111 comprises a selectively openable top 101. Additionally, a package identifier reader 117 is affixed to the container, capable of scanning package identifiers 36 on the packages 35. This allows the drop container 111 to automatically receive and store one or more packages 35 based on the identifiers. Moreover, upon detecting package identifier information, the drop container 111 is designed to automatically open its top 101, enabling a package 35 to be received. Following this, the internal frame 15 housing the package 35 actuates its release mechanism 40 to deposit the package into the drop container. Here, a stack of received packages 109 is visible within the drop container 111.

Returning to the delivery system 101, the top portion 10 of the external frame includes one or more cutout sections 25, each tailored to receive and detachably fasten a corresponding internal frame 15. These cutout sections are detachably fastened to their designated areas on the top portion using latches 45. The internal frames, crafted from either transparent plastic or an opaque material, are designed to hold anywhere from one to four elongated tubes, each differing in size and layout. Various embodiments present chambers with dimensions such as 8 inches by 8 inches by 24 inches, or 10 inches by 10 inches by 36 inches. The external frame further encompasses an outer wall 20 descending from the top portion 10. This wall 20 is designed to at least partially enclose the sides of the internal frames 15.

The drop container 111 further integrates an internal temperature regulation system 103. This ensures that the content within remains at a desired temperature. The drop container 111 can also be selectively opened through its side 107 via a lock 119, granting convenient access to its internal storage. Other design elements of the drop container 111 include grip legs 113, an actuator system 115 for managing the top opening 101, and an optional top panel 105 that can be selectively opened. In some embodiments, drop containers are modular and are configured to stack on top of each other.

Figure 3:
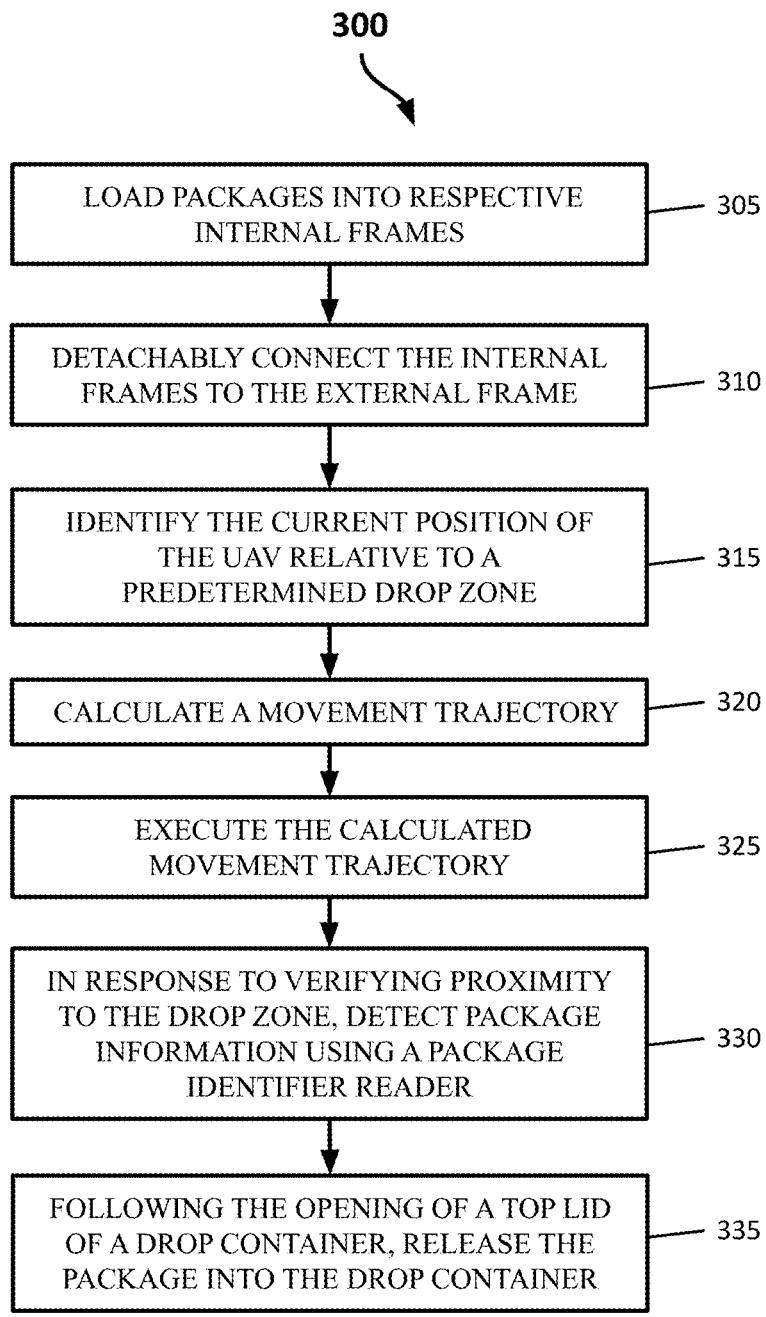
FIG. 3 illustrates a flow diagram of an example process of package delivery.

FIG. 3 illustrates a flow diagram detailing an exemplary package delivery process 300. The process commences with the loading of packages into the internal frames 305. These internal frames are then detachably connected to the external frame on the UAV 310. Once set, the current position of the UAV is identified relative to a predetermined target drop zone 315. A movement trajectory is then calculated to ensure the distal end of the internal frame, which holds a package, is appropriately positioned near the target drop zone 320. Following this, the UAV's propulsion system activates to follow the calculated trajectory 325. When the UAV and its delivery system are confirmed to be near the target drop zone, a package identifier reader on a drop container checks for package identifier information 330. After successfully detecting and verifying this information, the drop container's top lid automatically opens. The package is then released from its internal frame and safely placed into the drop container 335.

In terms of communication, the package identifier reader 117 and the package identifiers can utilize a variety of technologies, including but not limited to, near field communication, radio-frequency identification, Bluetooth, Wi-Fi, infrared, cellular, and combinations thereof.

Another aspect of this invention includes a smart device equipped with an application. This application is crafted to facilitate user interactions, allowing users to track packages within the delivery system. It grants users the capability to interact with various components of the system, including the control system and package identifier reader. Moreover, in some embodiments, the application bestows users with the ability to exercise limited control over the operations of the delivery system.

Deliveries are categorized as either urgent or non-urgent. Drones used for urgent deliveries have a weight limit, typically ranging from 0.01 kg to 10 kg. Non-urgent deliveries have their own weight guidelines. To place an order, users start with the mobile app. Here, they choose a particular commercial vendor, signaling the urgency level of their delivery. For expedited, urgent deliveries, users must affirmatively ensure and acknowledge that the merchandise in question adheres to the set weight parameters.

Following this, users proceed to select their desired items and finalize the payment process. Once the order is placed, the vendor readies the items for shipment. These items are packed within specially designed drone delivery packets. These packets, optimized for compatibility with the disclosed drop containers, come in two varieties: insulated and non-insulated. Their design serves to sustain specific temperature ranges, ensuring the integrity and quality of the items within.

The invention provides a comprehensive solution for UAV-based package delivery. Through a combination of an intricate frame system and a dynamic drop container, coupled with advanced technology components and user interaction capabilities, the invention streamlines and enhances the process of delivering packages using UAVs.

The invention further offers an innovative approach to autonomous delivery systems capable of managing multiple packages via UAVs. This system makes use of drones, inclusive of VTOL models, equipped with a design framework tailored for delivering packages of varying sizes to distinct destinations in a single flight operation.

Overall, this invention is poised to revolutionize the multi-package delivery paradigm, transforming it into a cohesive operation that introduces unprecedented scale and efficiency to the drone delivery industry. In a specific embodiment, the drone delivery framework could be entirely owned and operated by corporations to facilitate direct product deliveries to their clientele. Companies like Amazon, McDonald's, US Post Office, FedEx, or CVS might launch their exclusive drone fleets. Such a hands-on approach in the delivery journey would resonate with their brand ethos, amplifying customer trust and fostering brand loyalty.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

I claim:

1. A delivery system for an unmanned aerial vehicle (UAV) comprising:
   a drop container, wherein: the drop container has a selectively openable top; and the drop container includes a package identifier reader configured to scan package identifiers on packages, the drop container being configured to receive and store one or more packages;
   an external frame attached to the UAV, said external frame having a top portion;
   one or more internal frames, each with a proximal end and a distal end, wherein:
   the proximal end is connected to the top portion of the external frame; and
   the distal end includes a release mechanism configured to selectively release packages stored within said one or more internal frames.

2. The system of claim 1, wherein the one or more internal frames further comprise a plurality of inner notches configured to selectively support and release packages stored within said one or more internal frames.

3. The system of claim 1, wherein the top portion of the external frame includes one or more cutout sections, each configured to receive and detachably fasten the corresponding one of the one or more internal frames.

4. The system of claim 3, wherein the external frame further comprises an outer wall descending from said top portion, configured to at least partially enclose the sides of the one or more internal frames.

5. The system of claim 4, wherein the one or more internal frames are removably coupled to the external frame.

6. The system of claim 1, wherein, upon detecting package identifier information via the package identifier reader, the drop container automatically opens its top, facilitating the receipt of a package; subsequently, the internal frame housing the package actuates its release mechanism to deposit the package into the drop container.

7. The system of claim 1, wherein the drop container further comprises an internal temperature regulation system.

8. The system of claim 1, wherein the drop container is selectively openable through the side of the container so that internally stored packages are readily accessible.

9. The system of claim 1, wherein the package identifier reader and package identifiers communicate using one or more of the following technologies: near field communication, radio-frequency identification, short-range wireless interconnection of electronic devices, a wireless network that uses radio waves to provide wireless internet access, infrared, or cellular, or any combination thereof.

10. A package delivery system configured to be coupled with an unmanned aerial vehicle
   (UAV), comprising:
   a drop container equipped with:
   a top lid that can be selectively opened and closed; and
   a package identifier reader designed to read identifiers on incoming packages;
   wherein the drop container is configured to selectively receive and securely store one or more packages;
   a housing having an external frame and one or more internal frames, wherein:
   each internal frame has a proximal end, a distal end, and a plurality of inner notches configured to selectively support and release packages stored within said internal frame;
   an electromechanical component affixed to the distal end of each of the one or more internal frames, said electromechanical component configured to:
   assume a first position for engaging a stored package, thereby securing the package within its corresponding internal frame; and
   assume a second position for disengaging the stored package;
   a control system programmed to:
   determine the position of the delivery system relative to a predetermined target drop zone;
   calculate a movement trajectory required for positioning the distal end of the internal frame containing the package proximate to the target drop zone;
   actuate the propulsion system of the delivery system to execute the calculated movement trajectory;
   verify that the delivery system is proximate to the target drop zone; and
   release the stored package from the internal frame upon confirmation that the delivery system is proximate to the target drop zone.

11. The package delivery system of claim 10, wherein:
upon detection of package identifier information by the package identifier reader, the drop container's top lid automatically opens; and
the control system is further programmed to initiate the release of the stored package into the drop container after confirming that the package delivery system is proximate to the target drop zone and after the drop container's top lid has opened.

12. The system of claim 11, wherein:
the external frame further comprises an outer wall descending from said top portion, configured to at least partially enclose the sides of the one or more internal frames; and
wherein the package identifier reader and package identifiers communicate using one or more of the following technologies: near field communication, radio-frequency identification, short-range wireless interconnection of electronic devices, a wireless network that uses radio waves to provide wireless internet access, infrared, or cellular, or any combination thereof.

13. The system of claim 10, wherein the one or more internal frames are removably coupled to the external frame and wherein the top portion of the external frame includes one or more cutout sections, each configured to receive and detachably fasten a corresponding one of the one or more internal frames.

14. A method of delivering packages via an unmanned aerial vehicle (UAV) equipped with a package delivery system, the method comprising the steps of:
determining a current position of the UAV relative to a predetermined target drop zone, where the package delivery system includes one or more internal frames, each having a proximal end and a distal end; calculating a movement trajectory required to position the distal end of an internal frame, which stores a package to be delivered, proximate to the target drop zone;
actuating the propulsion system of the UAV to execute the calculated movement trajectory;
detecting package identifier information using a package identifier reader situated on a drop container;
automatically opening a top lid of the drop container upon detection of the package identifier information;
depositing the stored package into the drop container following the verification that the UAVis proximate to the target drop zone and subsequent to the opening of the top lid of the drop container:
verifying that the UAV and its package delivery system are proximate to the target drop zone; and
releasing the stored package from the internal frame upon verification that the UAV is proximate to the target drop zone.

15. The method of delivering packages of claim 14, wherein prior to determining a current position of the UAV:
the one or more internal frames are filled with the packages to be delivered;
the one or more internal frames are removably coupled to an external frame attached to the UAV, wherein the external frame has a top portion to which the proximal end of the internal frames is connected; and the distal end of each of the one or more internal frames includes a release mechanism configured to selectively release the packages stored within.

16. The method of delivering packages of claim 15, wherein the package identifier reader and package identifiers communicate using one or more of the following technologies: near field communication, radio-frequency identification, short-range wireless interconnection of electronic devices, a wireless network that uses radio waves to provide wireless internet access, infrared, or cellular, or any combination thereof.

* * * * *